Sept. 15, 1964   W. R. WEEKS   3,149,214
THERMALLY RESPONSIVE CAM-CONTROLLED CYCLING SWITCH
Filed May 29, 1963
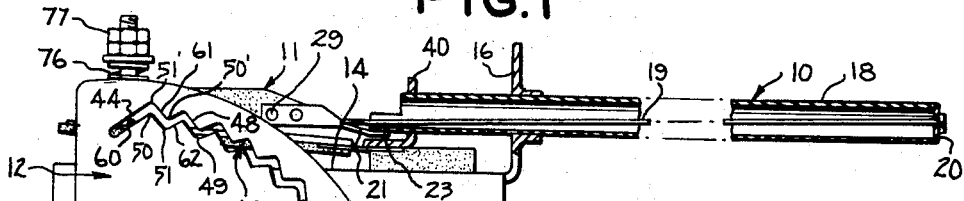
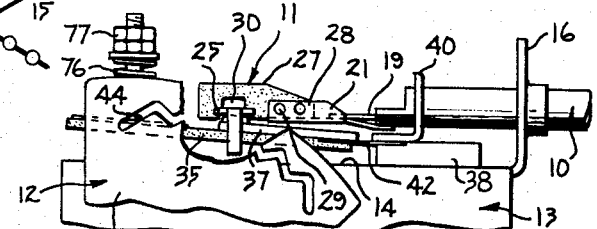
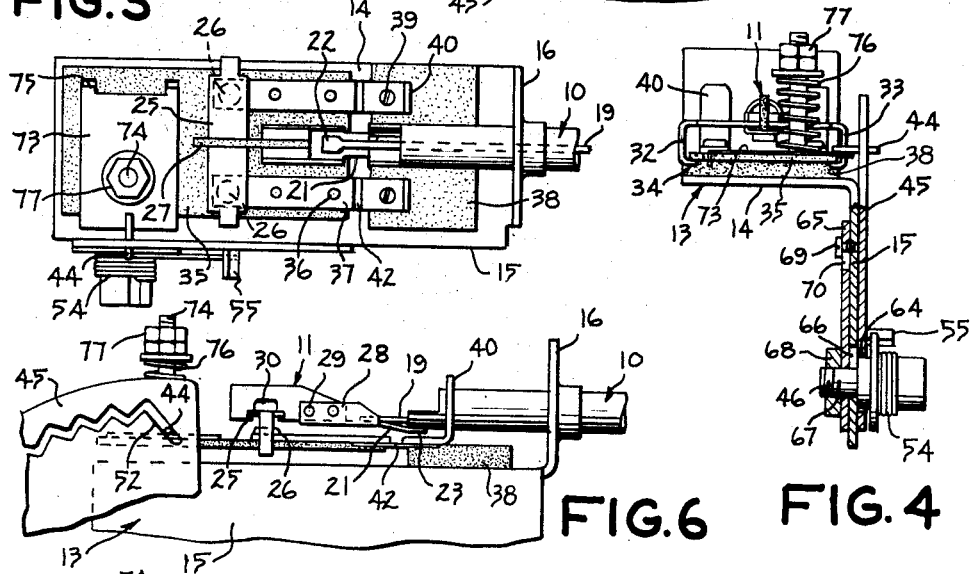
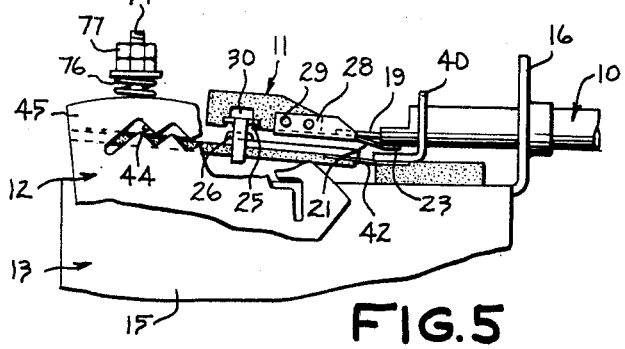
INVENTOR.
WALTER R. WEEKS
BY Richard L. Caslin
HIS ATTORNEY

United States Patent Office 3,149,214
Patented Sept. 15, 1964

3,149,214
THERMALLY RESPONSIVE CAM-CONTROLLED CYCLING SWITCH
Walter Rogers Weeks, New Hartford, N.Y., assignor to General Electric Company, a corporation of New York
Filed May 29, 1963, Ser. No. 284,178
7 Claims. (Cl. 200—136.3)

The present invention relates to a temperature responsive control device and particularly to one that is useful in limiting the maximum temperature within a heated control area, and for holding this maximum temperature for a predetermined length of time before finally de-energizing the heating means.

In recent years baking ovens for use in the home have been designed with an automatic heat cleaning cycle whereby the temperature of the walls of the oven liner is raised to a maximum temperature between about 750° F. and 950° F. so as to burn off all food soil and leave the oven cavity walls perfectly clean as is taught in an earlier co-pending application of Bohdan Hurko, Serial No. 244,493 filed December 13, 1962, now Patent No. 3,121,158 which is assigned to the General Electric Company, assignee of the present invention. The normal cooking temperatures vary from about 150° F. to a maximum of about 550° F. These cooking temperatures are controlled in the standard oven by a hydraulic thermostat having an elongated bulb or probe formed at the end of a capillary tube that is joined at the other end to a bellows or diaphragm within the thermostat housing, of the general type shown in the Ettinger Patent No. 2,260,014 which has been widely used as an oven thermostat for many years. The thermally responsive fluid used in the hydraulic control system has been able to withstand the normal cooking temperature range without difficulty, but the fluids available today cannot be operated at temperatures much above this range.

Accordingly, it has been necessary to devise a temperature responsive control device which is useable on the heat cleaning range of between 750° F. and 950° F. and serves to prevent the maximum oven temperature from rising above a preset maximum temperature that lies between 750° F. and 950° F. Also, to take care of situations when a large amount of soil is present in the oven it is desirable to hold this maximum heat cleaning temperature for a predetermined amount of time, for example, thirty to sixty minutes so as to obtain a thorough cleaning action. Finally, it is desirable to provide a shut-off means for the heat generating source so that the heat cleaning cycle is automatic from start to stop and may be accomplished while the housewife is absent from the kitchen. During such heat cleaning cycles the thermostat bulb is either withdrawn from the oven cavity or shielded by a cover means so that it is not exposed to the high temperatures. A shielding system is described and claimed in the patent of Christian A. Eff 3,059,088 which issued on October 16, 1962, and is also assigned to the General Electric Company, assignee of the present invention.

The principal object of the present invention is to provide a temperature responsive control device for controlling the energization of a heating source for a given area so as to limit the maximum temperature within the area as well as to hold the maximum temperature for a predetermined time, and then to automatically de-energize the heating source so as to provide an automatic cycle.

A further object of the present invention is to provide a temperature responsive control device of the kind described with a latch type of switch mechanism having a trip-free manual reset.

A still further object of the present invention is to provide a temperature responsive control device with a stepped cam means that is capable of closing and opening the switch contacts with a snap action and where the temperature sequence automatically terminates in an OFF condition.

The present invention, in accordance with one form thereof, embodies a temperature responsive control device including a supporting frame with an expansible temperature sensor means joined with a thermostatic switch member that has both a temperature controlled contact means and a follow contact means. A cam mechanism is also included and it has a plurality of alternate ON and OFF positions which cooperate with a cam follower that is combined with the follow contact means. This cam mechanism in its ON position serves to bias the switch contact means closed, and in its OFF position serves to bias the switch contact means open. A rise in temperature experienced by the sensor means serves to exert a force on the temperature controlled contact means tending to separate the two switch contact means, while a lowering of the temperature serves to exert a force tending to close the two switch contact means. The cam mechanism also includes a final cycle termination position which serves to receive the cam follower and lock the switch contact means in an open circuit position so that the cam mechanism must be reset before the heating cycle can be repeated.

My invention will be better understood from the following description taken in conjunction with the accompanying drawing and its scope will be pointed out in the appended claims.

FIGURE 1 is a side elevational view partly in cross-section of a temperature responsive control device constructed in accordance with the present invention and showing the manually resettable cam mechanism in its initial starting position;

FIGURE 2 is a fragmentary view similar to that of FIGURE 1 with a part of the cam mechanism broken away to show the construction of the contacts of the switch member;

FIGURE 3 is a top plan view of the left half of the control device illustrated in FIGURE 1;

FIGURE 4 is a left end elevational view of the control device of FIGURE 1;

FIGURE 5 is an elevational view similar to that of FIGURE 2 with an instantaneous showing of the cam follower of the follow contact means while it is passing from the first ON position of FIGURE 2 to the first OFF position of the cam mechanism, thereby exerting a downward force on the follow contact means and rapidly separating the contacts of the switch member;

FIGURE 6 is an elevational view similar to that of FIGURE 5 showing the cam mechanism having passed through its various ON and OFF cycling positions, and with the cam follower coming to rest in the cycle termination position thereby holding the two switch contacts in an open circuit position.

Turning to a consideration of FIGURE 1 of the drawing, there is shown a temperature control device that includes as main elements or components a temperature sensor 10, a thermostatic switch member 11, and a cam mechanism 12 which is manually resettable for repeating the temperature control sequence. This control device is assembled on a single supporting frame 13 that is shown as formed from thin sheet metal stock having a horizontal wall 14 and a vertical wall 15 extending downwardly from one edge of the horizontal wall as is best seen in FIGURE 4. The frame 13 supports the temperature sensor 10 by folding up a vertical shield 16 along an edge of the horizontal wall 14.

The temperature sensor 10 is shown as a direct expansion tube and rod unit of generally standard design. Depending upon the maximum temperature encountered by this device other sensing elements could be substituted for the tube and rod unit. The temperature sensor 10 is adapted to be located within the oven cavity and it includes an elongated tube 18 which encompasses a solid rod 19, where the rod is fastened to the tube at the extreme end thereof as at 20. The opposite end of the rod 19 extends out of the tube and is connected to the outer end of a flat cantilever spring member 21 as at 22 as seen in the plan view of FIGURE 3. The supported end of the cantilever spring member 21 is connected to the innermost end of the tube 18 as at 23 as shown in FIGURE 1. The tube 18 and rod 19 are made of dissimilar metals so that as the temperature rises the rod 19 will be pulled into the tube 18, due to the tube material having a greater rate of expansion than that of the rod material, thereby tilting the spring member 21 upwardly as is seen in FIGURE 5. When the temperature drops and the parts cool down the tube 18 will contract more than the rod 19, thereby in effect tending to shift the rod to the left as seen in FIGURE 5 and causing the spring member 21 to be lowered into a generally horizontal position as seen in FIGURE 6.

The switch member 11 is a single pole, double break type that comprises a temperature controlled contact bridge 25 for making and breaking contact with a pair of spaced cam-controlled contacts 26. The contact bridge 25 is an electrical conductive member fabricated from thin metal faced with a contact material such as a fine silver alloy, all insulated from but carried by the cantilever spring member 21 as by means of the insulator 27. To fasten the insulator 27 to the spring member 21, the distal end of the spring member is folded into an upwardly directed channel formation 28 in which the insulator is positioned and held in place by a rivet fastener 29 that extends through the sides of the channel formation. The insulator 27 has a notched portion 30 in its bottom edge while the sides of the notch contain opposing groves which accommodate the contact bridge 25 therein. As best seen in FIGURE 4, the opposite ends of the contact bridge 25 are each provided with downwardly turned side arms 32 and 33. The tips 34 of these side arms are folded inwardly to form back stops or limit means for reasons which will best be explained hereinafter.

The two follow contacts 26 are fastened on a single insulation piece or carrier 35 as by means of rivets 36. Each follow contact 26 is part of an elongated blade 37 of brass or the like through which the rivets 36 extend into the carrier 35. There is a second insulating mounting block 38 that is fastened to the frame 13. A pair of terminal blades 40 are fastened to the mounting block 38 by the two rivets 39 as best seen in FIGURES 1 and 4. A flat thin beryllium-copper spring strip 42 has been placed under each blade 37 and it extends across to the mounting block 38 where it is captured under the terminal blade 40 by rivet 39. Accordingly, this temperature control device would be connected in the hot side of the supply leads for the heating elements of an electric oven. The leads in the heating circuit would be provided with a pair of female clip members which would be quick-connected to the terminal blades 40 of the switch member 11 of the present invention. Notice that the carrier 35 is separated by a gap from the mounting block 38. This gap is bridged by the spring strip 42 to form a pivot or hinge means for each of the contact blades 37 so that the carrier 35 may pivot with respect to the mounting block 38 as can be seen by comparing FIGURE 5 with FIGURE 6.

The carrier 35 which carries the follow contacts 26 is also provided with a cam follower in the form of a small pin 44 as is best seen in FIGURES 2, 3 and 4. A pivoted cam member 45 is supported from the vertical wall 15 of the frame 13 as by means of a shouldered bolt 46. The cam member 45 is adapted to swing counterclockwise in an arc between its right hand position of FIGURE 1 to its left hand position of FIGURE 6. The cam member 45 cooperates with the cam follower 44 to represent the cam mechanism 12 that was mentioned earlier. The cam member 45 is fashioned generally in the shape of an inverted equilateral triangle although it should be understood that this is not a critical feature. Adjacent the base of the triangle there is formed a slot 47 of saw-tooth configuration that is formed by a pair of generally parallel stepped or serrated surfaces such as top configuration 48 and bottom configuration 49. It is important to note that the transverse width of this saw-tooth slot 47 is slightly larger than the diameter of the cam follower 44 to give some freedom of movement of the follower within the slot. The bottom stepped configuration 49 may be described in detail as comprising an incline 60 that reaches a sharp peak 50 and then a descent into a rounded valley floor 51, and then a repetition of these peaks and valleys fivefold, and finally with a termination position 52 at the end of the slot 47 as is best illustrated in FIGURE 6 with the cam follower 44 shown in place. The top stepped configuration 48 is out of phase with the bottom configuration 49 in that the peak 50 is opposite a rounded surface 51' and the rounded valley 51 is opposite a peaked surface 50'.

A biasing force is exerted on the pivoted cam member 45 by means of a torsion spring 54 that is assembled on the bolt 46 and cooperates with a tab 55 on the cam so that a spring force is exerted to cause the cam member 45 to move in a counterclockwise direction around its pivotal axis when the cam is freed by the cam follower 44. A manual means for resetting the pivoted cam member 45 is provided by a tension member 56 that is illustrated as a bead chain. It is adapted to exert a pulling force on the cam member in a direction opposite the spring force of the torsion spring 54 so as to shift the cam member 45 from the final position of FIGURE 6 back to the starting position of FIGURE 1.

The following is a description of the operation of the control device of the present invention. The temperature sensing member 10 in its form as a direct expansion tube 18 and rod 19 unit begins to raise the bridging contact 25 as the temperature experienced by the sensor increases above about 600° F. However, a slight rise in temperature would not separate the bridging contact 25 from the follow contacts 26 because the cam member 45 serves to exert a switch-closing force against the follow contacts 26 by virtue of the upwardly inclined surface 60 to the left of the first peak 50 of the bottom configuration 49 of the saw-tooth slot 47 in the cam member. Accordingly, as the contact bridge 25 is raised by the expansion of the outer tube 18 of the temperature sensor a part of the downward force of the contact bridge 25 on the follow contacts 26 is removed so that the counterclockwise force exerted on the cam follower 44 by the inclined surface 60 tends to slide the cam follower 44 upwardly and this movement will tilt the carrier 35 and continue to press the follow contcats 26 against the contact bridge 25. As the temperature of the sensor 10 increases the contact bridge 25 continues to move upwardly and the follow contacts 26 move in unison. This action continues until the cam follower 44 slides off the sharp peak 50 in the cam slot 47 at which time the cam member 45 is caused to snap in a counterclockwise direction when the cam follower 44 strikes the downwardly inclined surface 61 in the top configuration 48 between the rounded surface 51' and the peaked surface 50'. Once the cam follower 44 is acted upon by the downwardly inclined cam surface 61 a downward force component is exerted against the cam follower as is best seen in FIGURE 5 which tends to snap the follow contacts 26 away from the contact bridge 25. The carrier 35 will move away from the contact bridge 25 until the limit stops 34 of the side arms 32 and 33 prevent further separation. The electrical power supplied to the heating elements of the oven would be OFF once the switch mechanism 11 is in its open circuit position of FIGURE 5.

Then the oven cavity would begin to cool down and the sensor 10 would also begin to sense this reduced temperature causing the tube 18 to contract and resulting in the lowering of the contact bridge 25 which in turn lowers the limit stops 34 and necessarily lowers the carrier 35 that carries the follow contacts 26. This lowering action continues until the cam follower 44 slips off the sharp peak 50' of the upper stepped configuration 48 with a snap action until the cam follower comes to rest against the upwardly inclined surface 62 on the bottom configuration 49. This upward inclination 62 exerts an upward force on the cam follower 44 thereby tending to snap the follow contacts 26 into circuit-making position with the contact bridge 25. Once the switch contacts are closed, the heat cleaning cycle repeats itself and the cam follower 44 moves a distance of one tooth for each cycle until the cam follower enters the cycle termination position 52 as is best seen in FIGURE 6 when a downward force is exerted on the cam follower to hold the switch contacts open so that they may not reclose. To begin a new heat cleaning cycle, the cam member 45 is manually reset by the chain 56 which swings the cam member from the final position of FIGURE 6 to the starting position of FIGURE 1. Then the upwardly inclined surface 60 exerts an upward force on the cam follower 44 to bias the follow contacts 26 into circuit closing relation with the contact bridge 25 as is best seen in FIGURE 2 until the predetermined maximum temperature of, for example, 850° F. is reached.

It is imperative to be able to adjust or calibrate this control device in order to compensate for engineering tolerances and be able to set the predetermined maximum temperature. This is accomplished by providing a calibration plate 65 as seen in FIGURE 4 in conjunction with the frame wall 15 and the shouldered bolt 46 of the cam member 45. This bolt 46 extends through a hole 64 in the cam member 45, throught an elongated slot 66 in the vertical wall 15 of the supporting frame 13, and the bolt is in fact assembled to the calibration plate 65 by extending into a close fitting opening 67 therein and being held in place by a nut 68. The two parts 15 and 65 are held tightly together by the nut 68 and the shoulder of bolt 46. Note that the cam member 45 rides free on the shoulder; that is, the height of the shoulder is slightly greater than the thickness of cam 45. The upper portion of the calibration plate 65 is also fastened to the wall 15 by means of a fastening screw 69 that extends through an elongated slot 70 in the plate. To adjust the maximum temperature of the device, the nut 68 and screw 69 of the calibration plate 65 are loosened slightly and the plate is shifted either up or down to position the cam member 45 by means of a trial and error until the proper temperature control is obtained. Then the nut 68 and screw 69 are tightened and the device is ready for use.

In order to protect the temperature sensor 10 from damage or overstrain exerted by the member 45, a resilient coupling is made between the cam follower 44 and the cam member 45. This resilient coupling is in the form of a pivot plate 73 as best seen in FIGURE 3 which carries the cam follower 44 at one edge thereof. A vertical post 74 is supported by the carrier 35 and it extends through an enlarged opening in the pivot plate 73. The edge of the pivot plate 73 that is opposite the cam follower 44 is provided with a pair of downturned tabs 75 which extend into fitted openings in the carrier and serve to stabilize the plate and hence the cam follower from turning in a horizontal plane. A compression spring 76 is installed over the vertical post 74 and it is held in place by means of a cap or nut 77. This spring 76 exerts a downward force on the pivot plate 73. The pivot plate 73 is designed to rise off of the carrier 35 whenever the insulator 27 pushes down on closed contacts 25 or 26 with an excess force. This serves to protect spring member 21 from excess loadings. This overloading of 21 would take place whenever the unit is cold (27 down hard) and the reset chain 56 is pulled, thus, forcing pin 44 upward to carry elements 35, 26, 25 and insulator 27 with it if the relief spring 76 were not interposed.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A temperature responsive control device comprising a supporting frame carrying an expansible temperature sensing means adapted to be located in an area where the temperature is to be controlled, a switch mechanism cooperating with the temperature sensing means, said switch mechanism having both a temperature controlled contact means actuated by the sensing means and a follow contact means for making and breaking an electrical circuit in which this control device is to be utilized, a stepped cam means pivotally mounted on the supporting frame, the follow contact means being combined with a cam follower that is governed by the stepped cam means, the follow contact means being normally biased by the stepped cam means into a circuit-making position with the temperature controlled contact means, a rise in temperature experienced by the temperature sensing means tending to apply a force on the temperature controlled contact means to move said contact means away from the follow contact means, the stepped cam means having a double saw-tooth configuration between which the cam follower is alternately positioned, the teeth of one configuration exerting a closing force on the contacts and the teeth of the other configuration exerting an opening force on the contacts, so that at a predetermined maximum temperature the cam follower will move away from the closing configuration to be engaged by the opening configuration which serves to separate the contacts with a snap-action, the double saw-tooth configuration being repetitive in nature whereby the switch contacts will cycle OFF and ON for a number of cycles at about the predetermined maximum temperature before the cam follower reaches a point in the stepped cam means where the switch is latched open by said cam means, and a manual means for resetting the position of the stepped cam means.

2. A temperature responsive control device including a supporting frame and an expansible temperature sensor means that is adapted to be located in an area where the temperature is to be controlled, a thermostatic switch member joined to the temperature sensor means and having both a temperature controlled contact means and a follow contact means, and a cam mechanism having a plurality of alternate ON and OFF positions, a cam follower combined with the follow contact means and being acted upon by the cam mechanism, said cam mechanism in its ON position serving to bias the switch contact means closed and in its OFF position serving to bias the switch contact means open, and means responsive to a rise in temperature experienced by the sensor means for exerting a force on the temperature controlled contact means tending to separate the two switch contact means, and said last-mentioned means being responsive to a subsequent drop in the temperature of the sensor means to exert a force tending to close the two switch contact means, and adjustment means for the cam mechanism to vary its relative position with respect to the normal position of the cam follower so as to render the cam mechanism critical to a predetermined maximum temperature of the sensor means for cycling the switch contacts to hold the temperature substantially constant, said cam means having a cycle-termination position which latches the switch contacts open once the cam follower reaches the said cycle-termination position.

3. A snap-acting thermostat comprising a supporting frame and an expensible temperature sensing means that is adapted to be located in a heated cavity wherein the temperature is to be raised to a predetermined maximum temperature and held for a given length of time until the thermostat is automatically inactivated, a switch member combined with the temperature sensing means and having a temperature controlled contact means cooperating with a cam controlled contact means, and a cam mechanism pivotally supported on the frame and including a plurality of alternate ON and OFF stepped positions and a final cycle-termination position, a cam follower combined with the cam controlled contact means and being acted upon by the cam mechanism, and means responsive to a rise in temperature of the sensing means for exerting a force on the temperature controlled contact means tending to separate the two switch contact means, and said last-mentioned means being responsive to a subsequent drop in the temperature of the sensing means to exert a force on the temperature controlled contact means tending to close the two switch contact means, the cam mechanism having a spring biasing means so that the mechanism in one of its ON positions serves to exert a force on the cam controlled contact means tending to close the switch contact means, the cam mechanism in one of its OFF positions tending to exert a force on the cam controlled contact means tending to open the switch contact means, the said stepped ON and OFF positions of the cam mechanism being separated to cause the cam follower to fall from one to the other with a snap action.

4. A temperature responsive control device comprising a direct expansion temperature sensor means combined with an electrical switch member having a temperature sensor controlled contact means cooperating with a cam controlled contact means, and a movable cam mechanism provided on the device and including a plurality of alternate ON and OFF positions, a cam follower combined with the cam controlled contact means and engageable with alternate ON and OFF positions of the cam, means responsive to a rise in temperature of the sensor means for exerting a force on the sensor controlled contact means tending to separate the two switch contact means, and said last-mentioned means being responsive to a subsequent drop in the temperature of the sensor means to exert a force tending to close the two switch contact means, and a spring biasing means being combined with the cam mechanism so that the cam follower in one of the said ON positions serves to exert a force on the cam controlled contact means tending to close the electrical circuit through the switch, the cam follower in one of the said OFF positions of the cam mechanisms tending to break the circuit, the said alternate ON and OFF positions of the cam mechanism being spaced from each other to cause the cam follower to jump from one to the other in order to obtain a snap action for the movement of the switch contacts.

5. A temperature responsive control device as recited in claim 4 wherein the cam mechanism is a pivoted member that is connected to an adjustable calibration plate by a pivot bolt whereby the control device may be calibrated for a desired cut-off temperature by shifting the supporting calibration plate and hence the cam mechanism with respect to the cam follower.

6. A thermostatic temperature control device comprising a temperature sensing means that is combined with an electrical switch member which is adapted to be connected in a power supply circuit of a heat generating means, the switch member having a first and a second switch contact means, the first switch contact means being connected to the temperature sensing means, and a stepped cam plate pivotally connected to the device, the second switch contact means being connected to the stepped cam plate by means of a cam follower, and relief spring means resiliently supporting the cam follower with respect to the second switch contact means, said relief spring means serving to prevent the overstressing of the sensing means when the control device is cold.

7. A temperature responsive control device including a supporting frame and a rod and tube type of direct expansion temperature sensor, the rod being positioned within the tube, one end of the rod being fastened to the related end of the tube, and a cantilever spring supported on the other end of the tube and connected adjacent its mid-portion to the other end of the rod at a point outside the tube, the rod and tube members having different rates of thermal expansion, and a switch member cooperating with the sensor and including a first and a second switch contact means, the first switch contact means being joined to the sensor by means of an insulating member connected to the free end of the cantilever spring, the second switch contact means being positioned on an insulating carrier member, and spring hinge means for connecting the carrier to the supporting frame, and switch terminal means fastened to the frame and electrically connected to the second switch contact means through the said spring hinge means, and a cam member pivotally connected to the frame, said cam member having a stepped cam track with a plurality of alternate ON and OFF positions, the carrier member including a cam follower engageable in the cam track, and spring biasing means exerted against the cam member to move the second switch contact means with a snap action when the cam follower slides from one to the other of the alternate ON and OFF positions of the cam member.

References Cited in the file of this patent
UNITED STATES PATENTS

| | | |
|---|---|---|
| 2,343,255 | Fisher | Mar. 7, 1944 |
| 2,793,270 | Burch et al. | May 21, 1957 |